(12) United States Patent
Kwok

(10) Patent No.: US 7,066,434 B2
(45) Date of Patent: Jun. 27, 2006

(54) SUCTION-ADHESIVE DEVICE

(75) Inventor: Chin-Pang Kwok, Kowloon (CH)

(73) Assignee: Golden Peak Plastic Works Limited, Kowloon (HK)

( * ) Notice: Subject to any disclaimer, the term of this patent is extended or adjusted under 35 U.S.C. 154(b) by 160 days.

(21) Appl. No.: 10/626,101

(22) Filed: Jul. 23, 2003

(65) Prior Publication Data

US 2004/0124325 A1 Jul. 1, 2004

(30) Foreign Application Priority Data

Aug. 1, 2002 (HK) ................. 02105663 A
Mar. 26, 2003 (HK) ................. 03102213 A

(51) Int. Cl.
*A45D 42/14* (2006.01)
*F16B 47/00* (2006.01)
(52) U.S. Cl. .................. 248/205.8; 248/205.5
(58) Field of Classification Search ............ 248/205.8, 248/206.3, 205.5, 363
See application file for complete search history.

(56) References Cited

U.S. PATENT DOCUMENTS

| | | | | |
|---|---|---|---|---|
| 3,747,170 A * | 7/1973 | Kieves | ......................... | 248/362 |
| 5,193,776 A * | 3/1993 | Nagai et al. | .................. | 188/67 |
| 5,820,116 A * | 10/1998 | Haese | ......................... | 269/21 |
| 6,550,735 B1* | 4/2003 | Zheng | ......................... | 248/304 |

FOREIGN PATENT DOCUMENTS

| CN | 98248552.2 | 5/2000 |
|---|---|---|
| FR | 2347563 | 11/1977 |

* cited by examiner

*Primary Examiner*—Amy J. Sterling
(74) *Attorney, Agent, or Firm*—Alix, Yale & Ristas, LLP

(57) ABSTRACT

A suction-adhesive device comprising a suction cup, a stem extending from the suction cup, and a body through which the stem extends. A spring interacts with the stem and the body for biasing the suction cup towards the body to apply suction. A coloured ring is fixed on the stem for indicating when the spring has drawn the suction cup towards the body.

16 Claims, 8 Drawing Sheets

SUCTION-ADHESIVE DEVICE

BACKGROUND OF THE INVENTION

The present invention relates to a suction-adhesive device. More particularly, although not exclusively, the invention relates to a device including a suction cup and a hook, typically for attachment to a bathroom wall tile, window or shower screen and from which articles such as a face washer, corded soap, a shower cap or other articles may be suspended.

It is known to use suction cup devices for securing items to a bathroom wall tile for example. Small soap dishes for example can comprise two such suction cups. The suction cups usually comprise a bulbous protrusion in the centre that passes through an aperture in the side of the soap dish. It is also known to provide suction cups with a hook from which items can be suspended. The hook may be integrally moulded with the cup or formed of a lessflexible material and attached to the cup.

The above and other known suction cup devices tend to hold more securely to a surface if the face of the suction cup, and/or the surface itself is moistened prior to attachment. Sooner or later however, air enters into the space between the cup and the surface and the device becomes detached and usually falls to the floor. This invariably occurs without advance warning, as there is no obvious visual indication that air has entered the space.

OBJECTS OF THE INVENTION

It is an object of the present invention to overcome or substantially ameliorate the above disadvantage and/or more generally to provide an improved suction-adhesive device.

DISCLOSURE OF THE INVENTION

According to the invention, there is provided a suction-adhesive device comprising a suction cup, a stem extending from the suction cup, a body through which the stem extends, and a spring interacting with the stem and the body for biasing the suction cup towards the body to apply suction. A visual indicator is fixed with respect to the stem for indicating when the spring has drawn the suction cup towards the body.

Preferably, the visual indicator is attached to or formed integrally with the stem.

Preferably, the visual indicator is a ring of contrasting colour compared with the body or a part thereof adjacent the ring.

In a preferred embodiment, the device includes locking means interacting with the body and the stem for selectively fixing the stem with respect to the body against deformation of the spring.

More preferably, the device further includes a handle attached movably to the body and interacting with the locking means.

It is preferred that the body includes a neck through which the stem extends and beyond which the visual indicator protrudes when the spring has drawn the suction cup toward the body.

In a specific construction, the locking means comprises a slide plate having a tongue extending therefrom and a cam surface. There is attached to the handle a pawl engaging with the cam surface, and the neck has an aperture through which the tongue passes to interact with the stem.

More specifically, the tongue interacts with an aperture in the visual indicator.

It is preferred that the handle is shaped like a hook.

For convenience, the stem has a pushbutton for depression against the action of the spring.

For convenience, the stem has a pushbutton against which the handle can press.

BRIEF DESCRIPTION OF THE DRAWINGS

A preferred form of the present invention will now be described by way of example only with reference to the accompanying drawings, in which.

DESCRIPTION OF THE PREFERRED EMBODIMENTS

Figure 1:
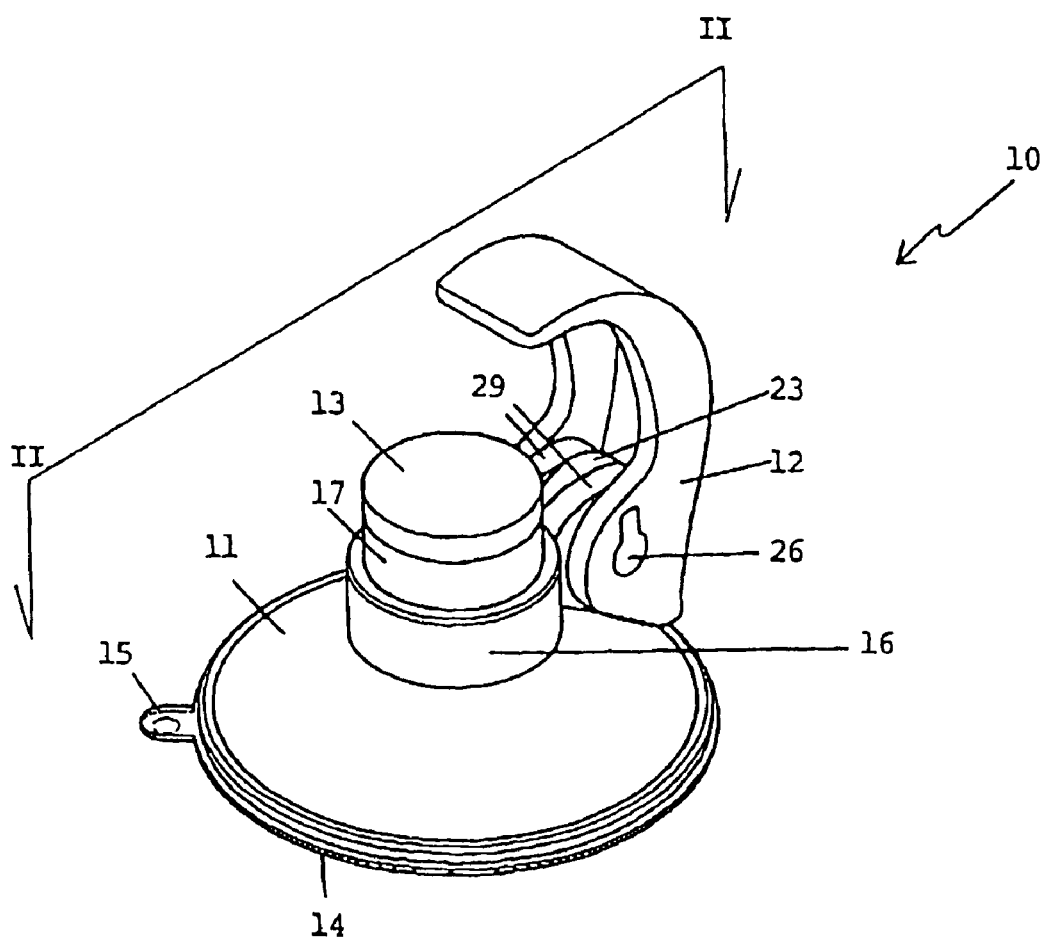
FIG. 1 is a perspective view of an embodiment of a suction-adhesive device in accordance with the invention.

In FIGS. 1 to 5 of the accompanying drawings, there is schematically depicted a suction-adhesive device 10. The device 10 comprises a body 11 typically moulded from rigid plastics material. The body 11 includes a neck 16 through which a stem 19 extends. At the top of the stem 19 there is provided a pushbutton 13.

A coil spring 18 is situated beneath the pushbutton 13 and surrounds an upper portion of the stem 19. The bottom end of the compression spring 18 bears downwardly on the body 11 to bias the stem 19 upwardly.

Surrounding an upper portion of the compression spring 19 and affixed with respect to the pushbutton 13 is a coloured ring 17. The ring 17 has a contrasting colour compared with that of the body 11 or its neck 16 and is preferably in red colour, and can be glued or otherwise adhered to the downwardly projecting annular lip of the pushbutton 13.

The stem 19 has at its bottom a flange 20 to which there is attached a suction cup 14. Suction cup 14 is made of smooth, flexible material, such as rubber, silicon or other suitable flexible, substantially fluid-impervious material. The suction cup 14 has a release tab 15 extending from its periphery.

Figure 2:
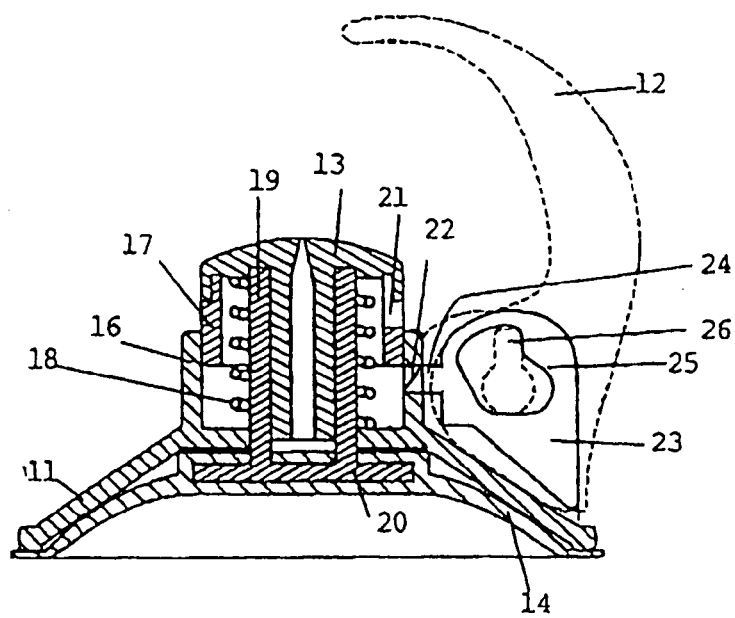
FIG. 2 is a cross-sectional side view of the device taken along line II—II of FIG. 1, the device being in a first configuration.

In the configurations depicted in FIG. 2, the suction cup 14 is biased upwardly by the spring 18 toward the body 11.

Attached pivotally to the body 11 is a handle 12. The handle 12 is shaped like a hook. A pawl 26 extends through a pair of webs 29 formed integrally with the body 11. Each web 29 has a large aperture therethrough to enable free turning of the pawl 26. The pawl 26 is shaped to fit tightly within a key-way of the same shape formed in the handle 12. Pawl 26 moves in unison with the handle 12.

Situated between the webs 29 is a slide plate 23. Slide plate 23 has a cam surface 25 being the inside edge of an aperture therethrough. The pawl 26 extends through this aperture to engage with the cam surface 25.

The slide plate 23 has a tongue 24 passing through an aperture 22 in the neck 16 of the body 11. There is also provided an aperture 21 formed between the coloured ring 17 and the pushbutton 13 with which the tongue 24 can interact.

When in the configuration of FIG. 2, the device has substantially no adhesive effect. To create a suction effect, the pushbutton 13 can be depressed. Such depression may conveniently be by pressing directly thereon with one's thumb, or alternatively by movement of the handle 12 to the position depicted in FIG. 3. When the pushbutton 13 is depressed the suction cup 14 will be pushed away from the body 11 by neck 19.

Figure 4:
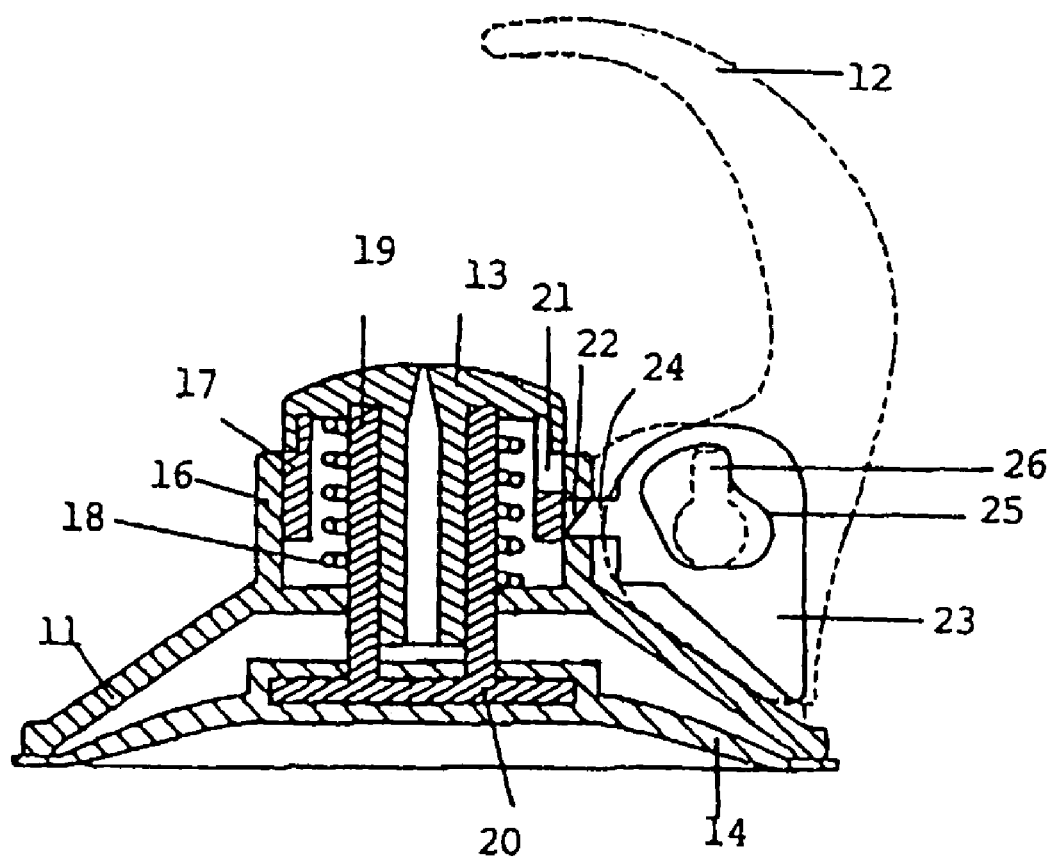
FIG. 4 is a cross-sectional side view of the device of FIG. 1, the device being in a third configuration.
Figure 5:
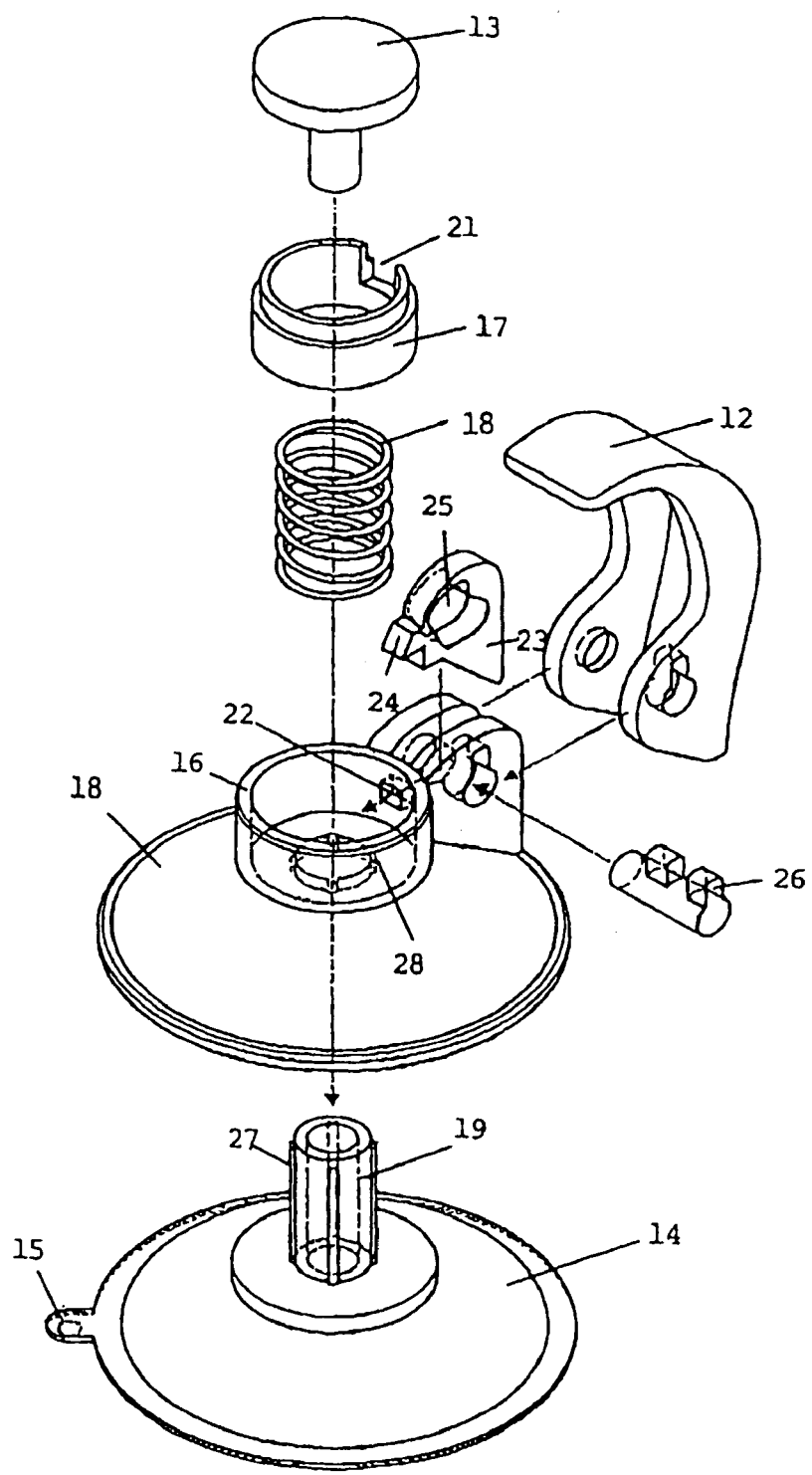
FIG. 5 is an exploded perspective view of the device of FIGS. 1 to 4.
Figure 6:
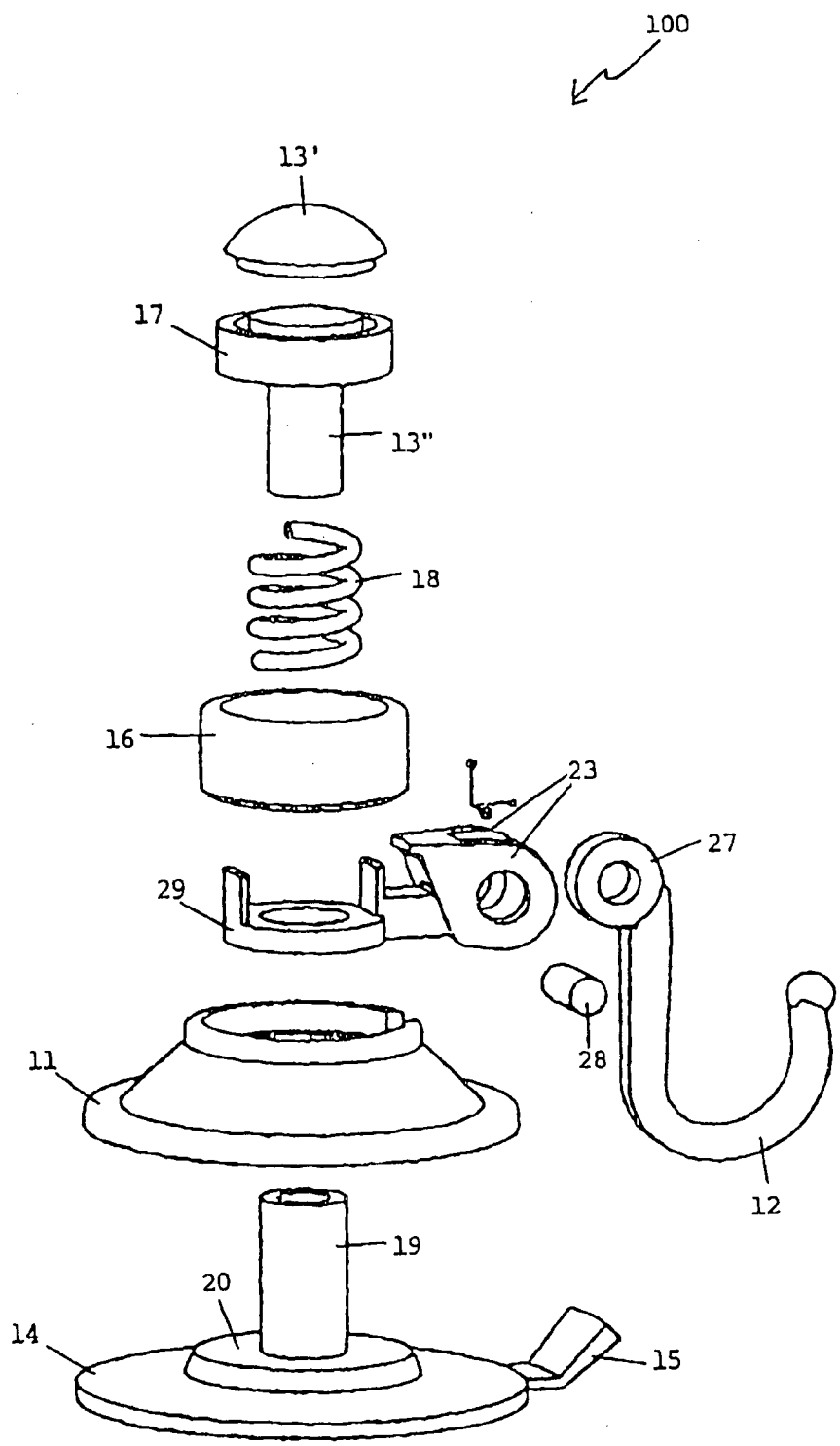
FIG. 6 is a schematic parts-exploded perspective illustration of another suction-adhesive device.
Figure 7:
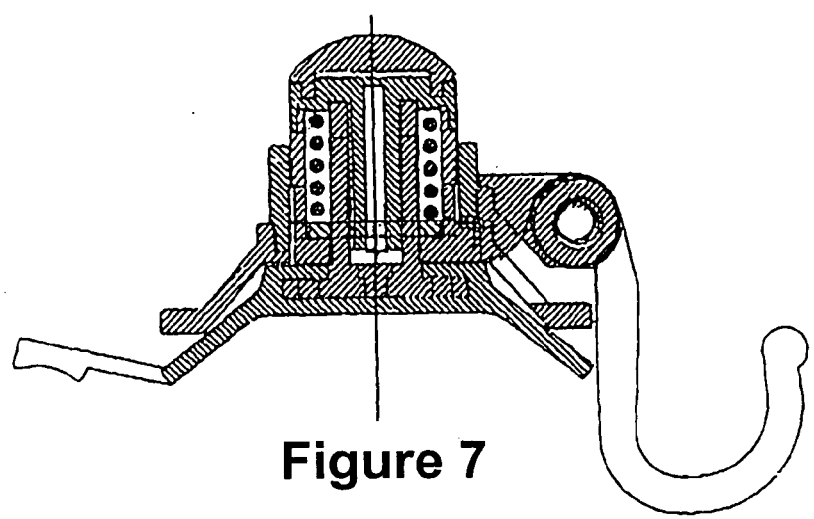
FIGS. 7 to 9 are schematic cross-sectional elevational views of the embodiment of FIG. 6 in various configurations.
Figure 8:
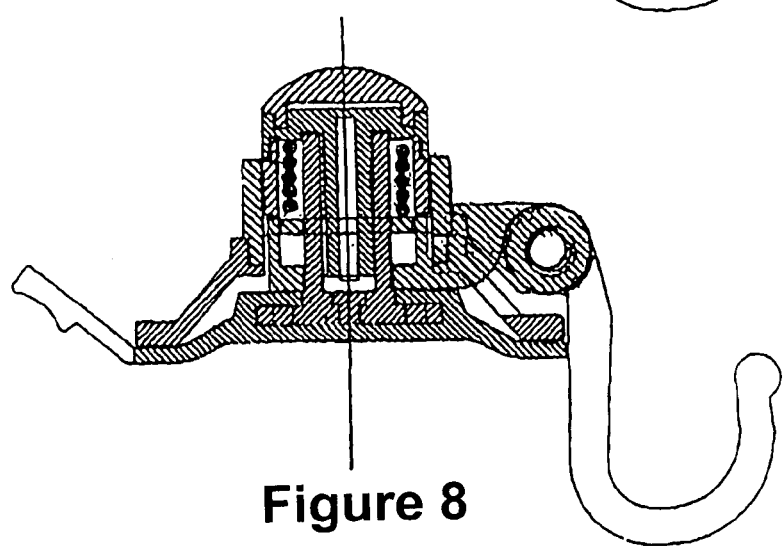
Figure 9:
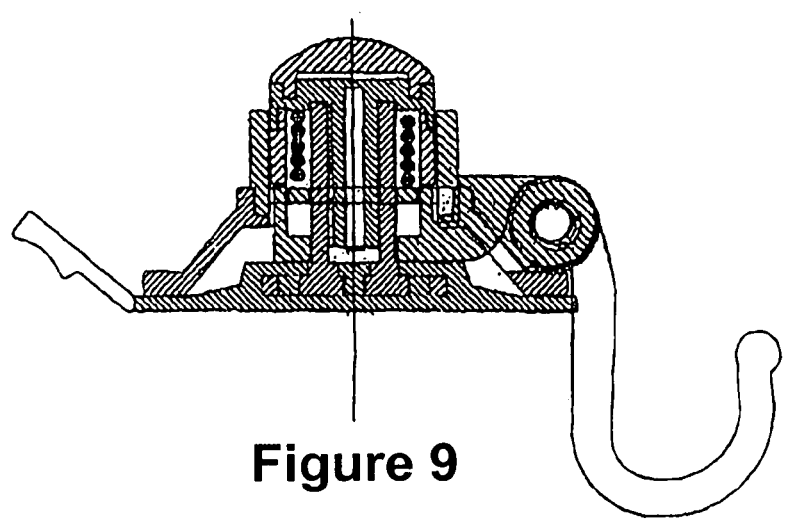
Figure 10:
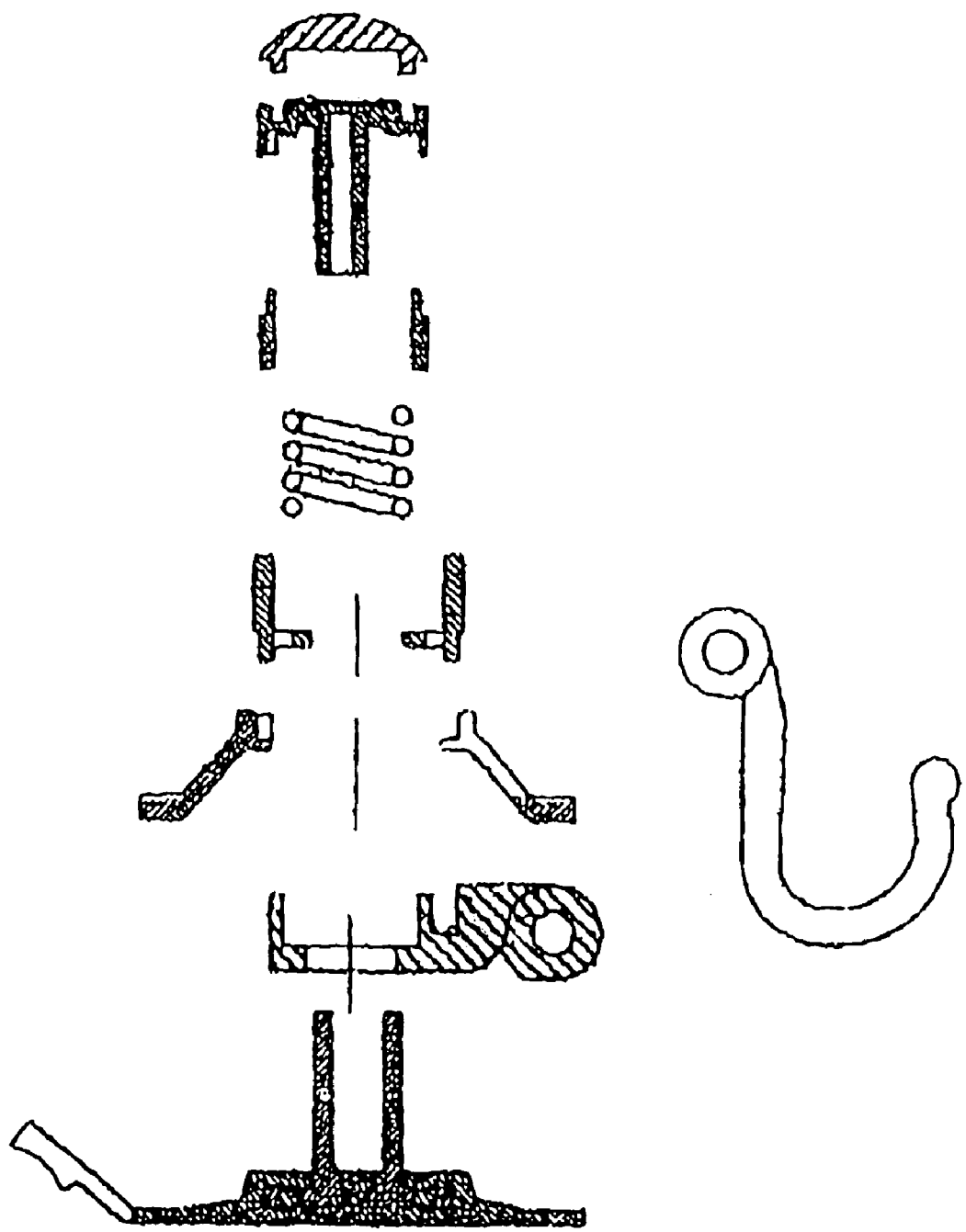
FIG. 10 is a schematic parts-exploded cross-sectional elevational view of the embodiment of FIGS. 6 to 9.

If the suction cup 14 is already placed against a tile for example and the pushbutton 13 is depressed by thumb-force for example, the device takes on the configuration of FIG. 4. By design however, it is equally possible that the handle 12 be pushed down upon the pushbutton 13 prior to placement of the suction cup 14 against a surface.

Figure 3:
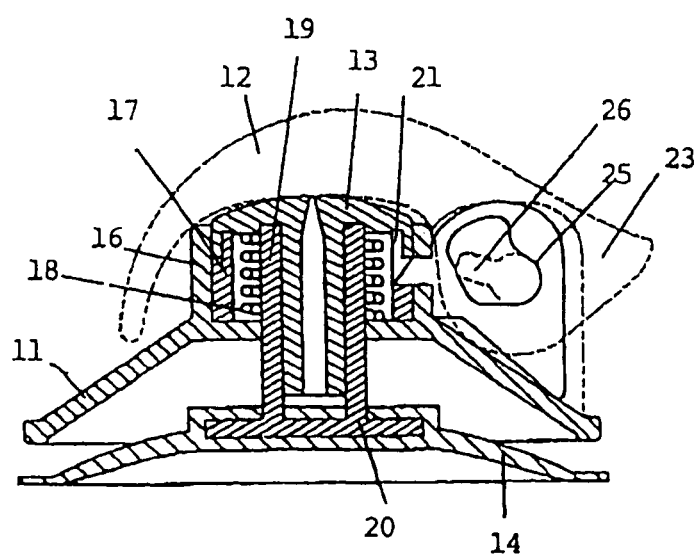
FIG. 3 is a cross-sectional side view of the device of FIG. 1, the device being in a second configuration.

When the handle 12 is pushed down such that the device takes on the configuration shown in FIG. 3, the pawl 26 pushes against the cam surface 25 to thereby cause the tongue 24 to pass through both apertures 22 and 21. As a result, the stem 19 is locked down against compression of spring 18. The suction cup 14 can then be placed against a surface and the handle 12 can be lifted, whereupon the pawl 26 pulls back on the cam surface 25 to draw the slide plate 23 away from the neck 16 to thereby release the tongue 24 from the aperture 21.

As a result, the stem 19 snaps into the position depicted in FIG. 4 by action of the compression spring 18. This produces a suction effect between the suction cup 14 and the surface against which it bears. The suction cup 14 and/or the surface against which it is to be adhered can be pre-moistened if desired.

Over time, air will leak into the space between the suction cup 14 and the surface to which it is attached. The spring 18 will cause the stem 19 to protrude gradually from the neck 16 and the coloured ring 17 will become exposed or visible. When this is noticed, one can easily push down upon the pushbutton 13 or press the handle 12 against the pushbutton 13 to expel air from the space between the suction cup 14 and the surface, thereby renewing the suction.

As the handle 12 is shaped like a hook, items can be suspended from it.

FIGS. 6 to 10 depict an alternative suction-adhesive device designated generally as 100. In this embodiment, there is no locking mechanism per se, but instead the hook-shaped handle 12 is attached pivotally between a pair of plates 23 by a pin 28 passing through ring 27. The plates 23 extend from a disc 29 through which the stem 19 passes. The remaining structural elements are for all intents and purposes the same as those described with reference to the preceding Figures. Suffice to say that the pushbutton comprises separate components 13' (button top) and 13" (button stem). There is an indicating ring 16, preferably of bright colour which when exposed upon ingress of the air between the suction cup 14 and surface upon which it adheres, is clearly visible indicating the need to again depress the pushbutton 13.

Figure 11:
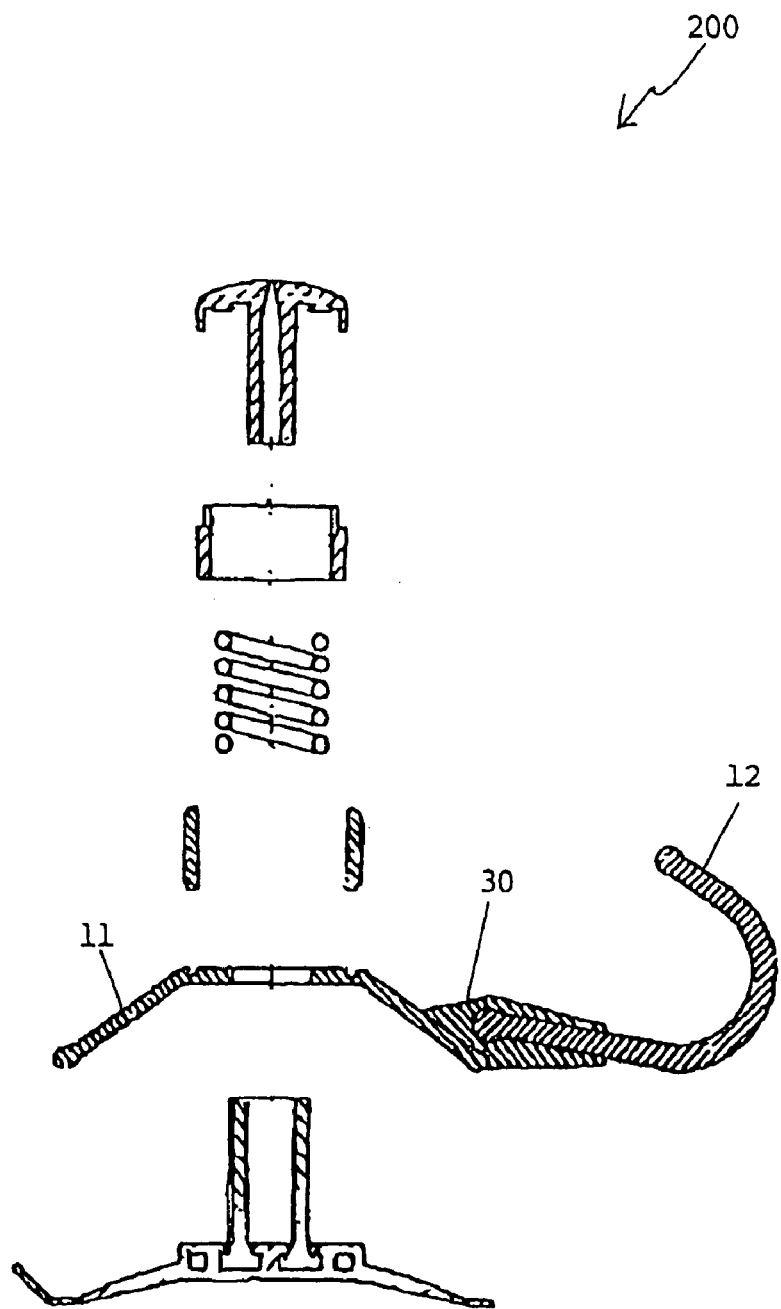
FIG. 11 is a schematic parts-exploded cross-sectional elevational view of a further embodiment.

FIG. 11 depicts a similar embodiment 200 having its hook 12 inserted within an extension 30 of the body 11. Other components of this embodiment will not be described as being similar or identical to those described with reference to the preceding Figures.

It should be appreciated that modifications and alterations obvious to those skilled in the art are not to be considered as beyond the scope of the present invention. For example, rather than providing the visual means of indication upon the stem directly, a pin or other extension from the suction cup might pass through another part or the body 11.

The invention claimed is:

1. A suction-adhesive device comprising:
a suction cup;
a stem extending from the suction cup;
a body through which the stem extends;
a spring interacting with the stem and the body for biasing the suction cup towards the body to apply suction;
a visual indicator fixed with respect to the stem for indicating when the spring has drawn the suction cup towards the body; and
locking means interacting with the body and the stem for selectively fixing the stem with respect to the body against deformation of the spring, said locking means comprising a slide plate having a tongue extending therefrom and a cam surface, and wherein there is attached to a handle a pawl engaging with the cam surface and wherein the body has an aperture through which the tongue passes to interact with the stem.

2. The device of claim 1, wherein the visual indicator is attached to or formed integrally with the stem.

3. The device of claim 1, wherein the visual indicator is a ring of contrasting colour compared with the body or a part thereof adjacent the ring.

4. The device of claim 1, wherein the handle is attached movably to the body and interacting with the locking means.

5. The device of claim 1, wherein the body includes a neck through which the stem extends and beyond which the visual indicator protrudes when the spring has drawn the suction cup toward the body.

6. The device of claim 1, wherein the tongue interacts with an aperture in the visual indicator.

7. The device of claim 4, wherein the handle is shaped like a hook.

8. The device of claim 1, wherein the stem has a pushbutton for depression against the action of the spring.

9. The device of claim 4, wherein the stem has a pushbutton against which the handle can press.

10. A suction-adhesive device comprising:
a suction cup;
a stem extending from the suction cup;
a body through which the stem extends;
a spring interacting with the stem and the body for biasing the suction cup toward the body and
locking means interacting with the body and the stem for selectively fixing the stem with respect to the body against deformation of the spring, said locking means comprising a slide plate having a tongue extending therefrom and a cam surface, and wherein there is attached to a handle a pawl engaging with the cam surface and wherein the body has an aperture through which the tongue passes to interact with the stem.

11. The device of claim 10, wherein the handle is attached movably to the body and interacting with the locking means.

12. The device of claim 10, and further comprising a coloured ring fixed with respect to the stem, wherein the body includes a neck through which a stem extends and beyond which the coloured ring protrudes when the spring has drawn the suction cup toward the body.

13. The device of claim 12, wherein the tongue interacts with an aperture in the coloured ring.

14. The device of claim 11, wherein the handle is shaped like a hook.

15. The device of claim 10, wherein the stem has a pushbutton against which the handle can press.

16. The device of claim 2, wherein the visual indicator is a ring of contrasting colour compared with the body or a part thereof adjacent the ring.

* * * * *